United States Patent [19]

Ruthroff

[11] Patent Number: 5,736,938
[45] Date of Patent: Apr. 7, 1998

[54] APPARATUS, EMPLOYING CAPACITOR COUPLING FOR MEASUREMET OF TORQUE ON A ROTATING SHAFT

[76] Inventor: Clyde L. Ruthroff, One Brook La., Holmdel, N.J. 07733

[21] Appl. No.: 643,546

[22] Filed: May 6, 1996

[51] Int. Cl.⁶ .................................................. G08C 19/10
[52] U.S. Cl. ................................................... 340/870.37
[58] Field of Search .......................... 340/870.01, 870.16, 340/870.28, 870.29, 870.3, 870.31, 870.32, 870.37, 870.4, 870.42

[56] References Cited

U.S. PATENT DOCUMENTS

| | | |
|---|---|---|
| 3,657,717 | 4/1972 | Glantschnig et al. ............ 340/870.29 |
| 4,242,666 | 12/1980 | Reschovsky et al. ............ 340/870.37 |
| 4,742,472 | 5/1988 | Juengal ............................ 340/870.37 |
| 4,862,752 | 9/1989 | Hoyt ................................. 340/870.37 |
| 5,353,020 | 10/1994 | Schurmann ...................... 340/870.31 |

*Primary Examiner*—Jeffery Hofsass
*Assistant Examiner*—Andrew Hill
*Attorney, Agent, or Firm*—Charles I. Brodsky

[57] ABSTRACT

Apparatus for measuring the horsepower transmitted by the drive shaft of an automotive vehicle, by determining the torque on the shaft through the measurement of the resistance of an included strain gauge, yet without the need for a power supply, such as a battery, being on the rotating shaft itself, and by employing a capacitive coupling to transmit power and signal to and from the drive shaft and fixed part of the vehicle.

12 Claims, 6 Drawing Sheets

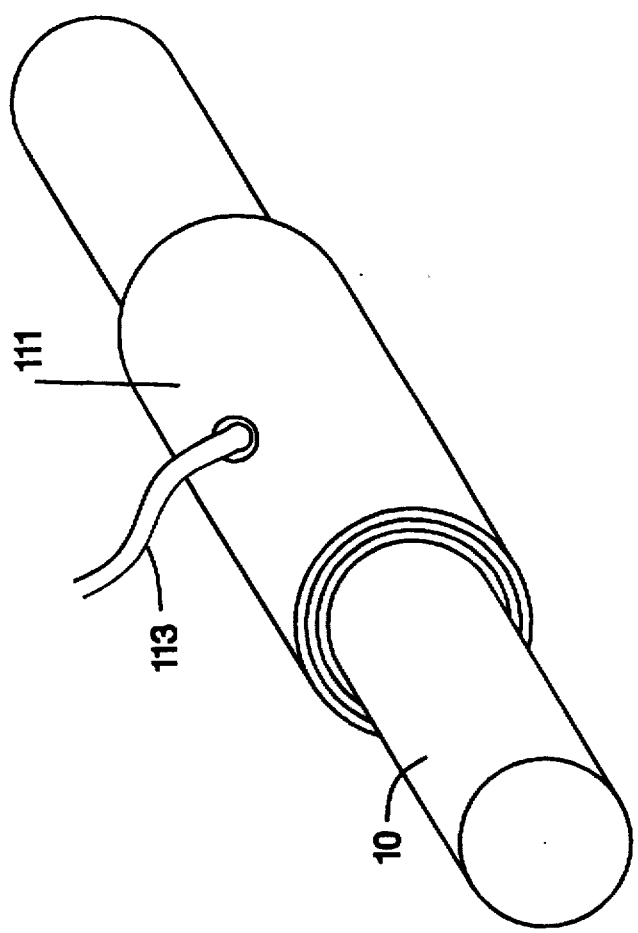

APPARATUS, EMPLOYING CAPACITOR COUPLING FOR MEASUREMET OF TORQUE ON A ROTATING SHAFT

FIELD OF THE INVENTION

This invention relates to automobiles, trucks and other motor vehicles, in general, and to the measurement of the horsepower being transmitted by their respective drive shafts, in particular.

BACKGROUND OF THE INVENTION

As is well known and understood, "Indianapolis-type" race car drivers and crews are very much concerned with the operation of their vehicle to provide optimum performance during the rigors of a "time-trial" or race. By being able to compare "actual" horse-power with "rated" horsepower, for example, the pit-crew can then make adjustments on the engine—to vary fuel mixtures, ignition timing, and whatever might be controllable to bring the engine to top performance. But, even to the everyday driver, an awareness of horsepower is significant, as an aid in determining when to shift gears in a manual transmission vehicle—as when driving up a hill or when passing the peak horsepower (where efficiency begins to drop off, where speed drops off, and where the horsepower decreases, as well). For the motoring enthusiast, additionally, it would be quite desirable to display on the dashboard of the vehicle—for instance—the actual horsepower being used—both for the entertainment value of providing such a "display", but also as an assist in shifting gears.

As is also well known and understood, the mechanical power transmitted through any rotating shaft is proportional to the multiplication product of the torque and the speed of the shaft, measured in revolutions per minute. Many conventional, well-known ways exist to measure the rotational speed of the shaft, without requiring any electrical source of power on the shaft itself. At the same time, conventional ways exist to measure the torque of the shaft by means of a strain gauge, whose resistance reflects the torque present. However, such measurement of the resistance of the strain gauge—in all instances—requires an electrical circuit which in turn requires power for its operation. There, then, a power supply (such as a battery) is typically installed on the rotating shaft itself. As will further be understood, such a battery periodically has to be changed and replaced, especially as its energy level is fairly low. Experience has shown that this is not just a simple and easy thing to do.

SUMMARY OF THE INVENTION

As will become clear from the following description, the apparatus of the present invention allows for these strain gauge measurements to be made, and the resultant torque determined, without the existence of a power supply—be it a battery or otherwise—on the rotating shaft. Conceptually stated, the apparatus of the invention entails transmitting electrical power from a first place A to a second place B in the direction A to B, for the purpose of powering electrical and/or mechanical equipment used in the measurement of, or operation of, equipment mounted at the second place B. Information obtained through the apparatus of the invention is then generated and transmitted back in the direction B to A, without any mechanical connection whatsoever while, at the same time, allowing a relative movement of A and B in various coordinates. With the invention, mechanical and electrical functions are then allowed to be performed on B, with information to be obtained on B, then transmitted back to A, without any source of power on B.

In a preferred embodiment of the invention to be described, a first means is included for transmitting electrical power from a first location towards a second location; second means is located at the second location, responsive to the electrical power received from the first means, for the purpose of operating a utilization apparatus; third means is then coupled to the utilization apparatus for generating a signal indicative of its performance, and for transmitting that signal back to the first means via the second means; to carry this out, the first means is stationary in operation, while the second means is mechanically rotational in operation, as where the first means includes a fixed electrical coil while the second means includes a rotating electrical coil—and in the automobile, truck and motor vehicle environment in question for measuring horsepower, the second means includes an electrical coil on a rotating mechanical shaft.

In the preferred embodiment of the invention to be described, the first means further includes an electrical power oscillator of given frequency, and where the fixed electrical coil is coupled with a pair of capacitors to series resonate at the frequency of the oscillator. At the same time, the rotating electrical coil is coupled across these capacitors to parallel resonate with it at the same frequency when further tuned with an added, third capacitor. Where a strain gauge is mounted on the rotating mechanical shaft and where the third means generates a signal indicative of the strain gauge at any given instant of time, a digital signal is generated, according to the invention, indicative of the resistance of the strain gauge, as utilized in determining the horsepower delivered to the wheels of the vehicle. As will become apparent to those skilled in the art, this operation is accomplished with the second means being devoid of any source of operating power and with an absence of mechanical interconnection between the first means and the second means. As will be appreciated by those skilled in the art, with the coupling provided by the first two capacitors, power and signal can be transmitted to and from the rotating and fixed members through the capacitors—with one plate of each being on the rotating member and the other plate of each being on the fixed member, with the coupling between them being effected through a mutual electrical field between the rotating and fixed plates of each capacitor.

BRIEF DESCRIPTION OF THE DRAWINGS

These and other features of the present invention will be more clearly understood from a consideration of the following description, taken in connection with the accompanying drawings, in which:

FIG. 5 illustrates another manner of operating the invention

DETAILED DESCRIPTION OF THE DRAWINGS

Figure 1:
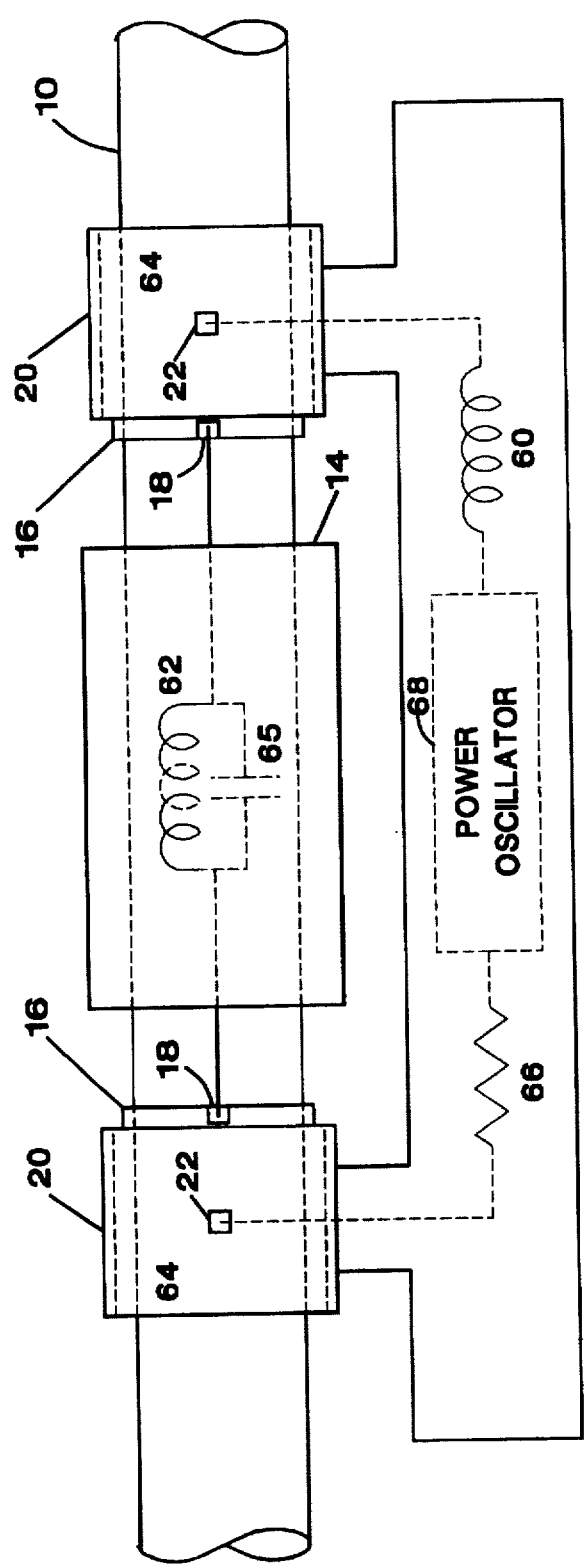
FIGS. 1 and 2 are helpful in an understanding of the mounting arrangement for the apparatus of the invention as employed with the rotating drive shaft of an automobile, truck, or other motor vehicle.
Figure 2:
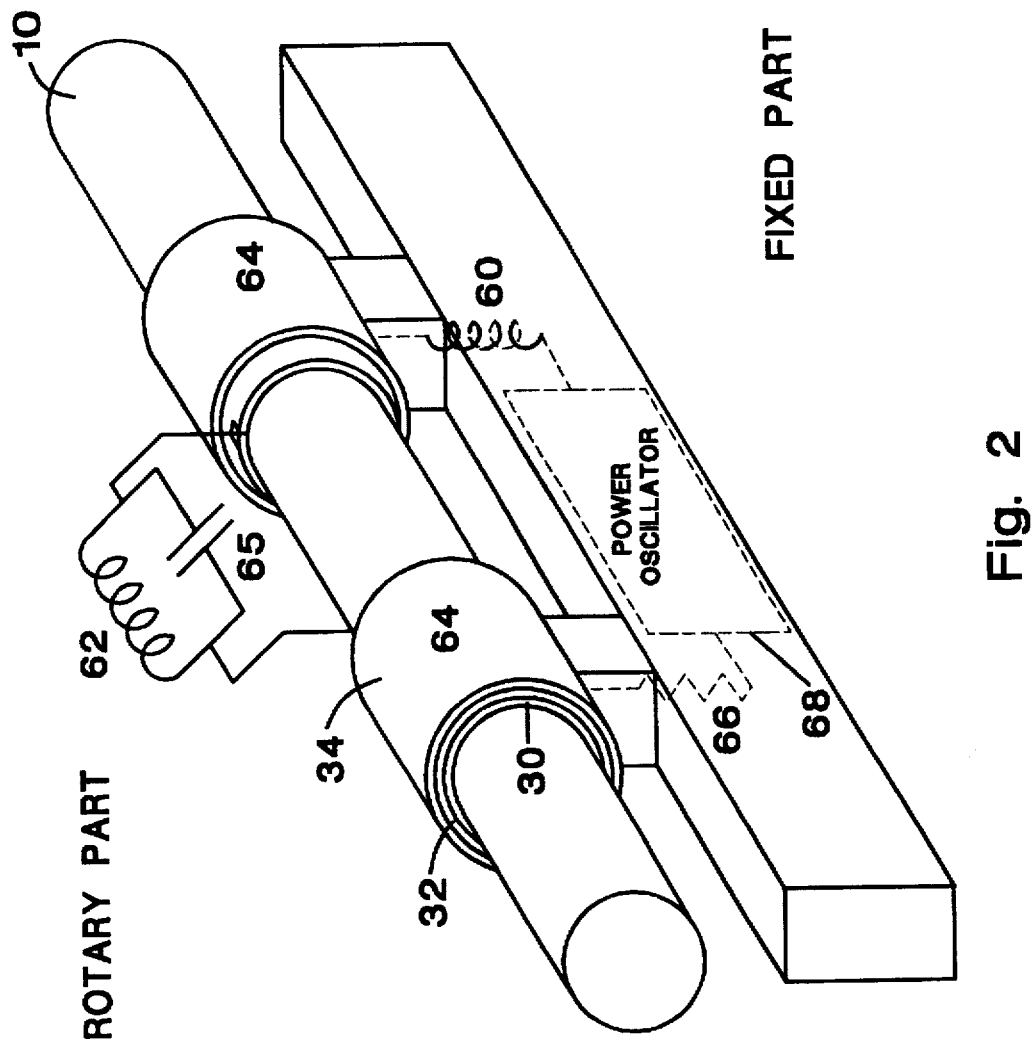

FIGS. 1 and 2 show a rotating shaft 10 that might be turning at 2,000 rpm on which is mounted a printed circuit board 14 in any appropriate manner. Mounted onto the printed circuit board 14 is a small coil 62 (preferably of the diameter of a pencil and some one-half inch long) in parallel connection with a capacitor 65—in essence to comprise a coil mounted on the rotating part of the apparatus—be it an automobile, truck or other motor vehicle—secured to its shaft and rotating along with it. Also mounted to the shaft 10 so as to rotate with it is an inner plate 16 of each of a pair of capacitors 64, as by being glued or similarly adhesively secured to the shaft 10. A metallized coupling pad 18 is formed on the inner capacitor plate 16 of each pair of capacitors, for electrically coupling one plate of the capacitor 64 to the parallel combination of the coil 62 and capacitor 65 on the printed circuit board 14. In such manner, the circuit board 14 along with inner capacitor plates 16 rotate along with the shaft 10.

In accordance with the invention, each capacitor 64 also includes an outer plate 20 which is fixed to the automobile, truck, or motor vehicle itself—and in a way to allow the inner capacitor plate 16 to rotate freely within it. As shown, a further metallized coupling pad 22 is provided on the fixed, outer capacitor plate 20, to couple in series with a second coil 60, a power oscillator 68, and a small resistor 66, also mounted and fixed to the automobile, truck or motor vehicle. As will be understood, FIGS. 1 and 2 thus illustrate a parallel combination of a capacitor 65 and a coil 62 (together with the other components of the tuned circuit 14) rotating on the automotive shaft along with the inner capacitor plates 16 while the outer capacitor plates 20, along with the series combination of the coil 60, the power oscillator 68 and the resistor 66 are fixed to the vehicle itself. In this respect, the coil 60 is also in the form of an inductor, of the diameter of a pencil and some one-half inch long.

In accordance with the invention as so far illustrated, it is to be understood that the two coils 60 and 62 are separated one from another, and are not inductively coupled. It would also be appreciated that one plate of each capacitor 64 is mounted on a fixed part of the motor vehicle and remains stationary, while the other plate is mounted on the rotating part of the motor vehicle and rotates along with its shaft 10. Electrical power is generated in this preferred embodiment in the high frequency oscillator 68 mounted on the fixed part of the vehicle—and, at its operating frequency, the coil 60 and the two capacitors 64 form a series resonant circuit to present an impedance substantially resistive in nature, equal to that of the small resistor 66. Such electrical power is then transmitted via the capacitors 64 to the parallel resonant circuit consisting of the coil 62 and the capacitor 65, which likewise are tuned to the frequency of the oscillator 68. In such manner, almost the entire generator voltage thus appears across the parallel resonant circuit, and is able to power the remaining components on the printed circuit 14. Such printed circuit, in turn, couples to a strain gauge, not shown, and other devices used to measure the torque of the rotating shaft 10. As will be appreciated, this voltage is used to power the electrical circuits there, which measure the resistance of the strain gauge, which codes that resistance into digital form according to the invention, and which transmits it back through the tuned circuits so created for use.

In this manner, electrical power transmitted from the fixed components is received by the rotating parallel resonant circuit for the purpose of powering the electrical and/or mechanical equipment used in measurement or operation of the equipment mounted on the rotating shaft. Information obtained by means of the electrical components of the invention is then generated and transmitted back to the fixed equipment of the vehicle, without any mechanical connection therebetween—while allowing relative movement of the two in a rotational manner.

(As FIG. 2 more clearly shows, the rotating inner capacitor plate 16 incorporates an insulation 30 on which is superimposed an outer thin metal film 32 to which the coupling pad 18 is connected—and to which the coil 62 and the capacitor 65 are soldered. As also shown, the fixed outer capacitor plate 20 slides over the inner plate 16, and includes an insulating material 34 which is metallized on the inside. Such construction will be more clearly shown in FIGS. 4a and 4b, to be described below.)

Figure 3:
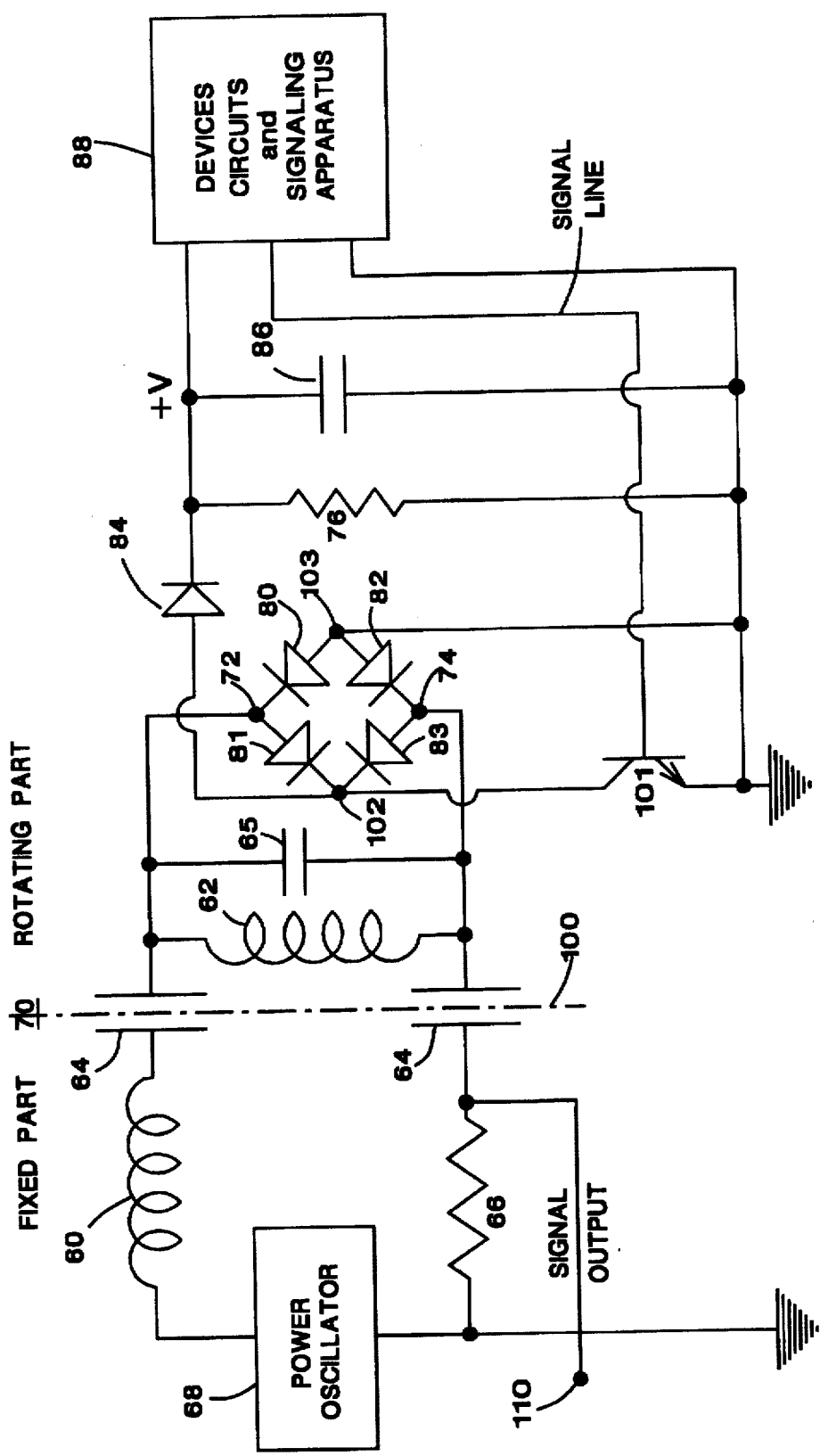
FIG. 3 is an electrical schematic diagram, partially in block form, helpful in understanding the operation of the apparatus of the invention.

FIG. 3 illustrates an electrical schematic diagram, partially in block form, of the apparatus of the invention. In particular, everything to the left of the vertical dividing line 100 is representative of the fixed part of the invention, and everything to the right representative of the rotating part of the invention. As previously noted, the coil 60, resistor 66 and one plate of the capacitor 64 is stationary, not free to move, while the coil 62, the capacitor 65 and the other plate of the capacitor 64 are able to rotate along with the shaft 10. As will be apparent, no mechanical connection exists between the two parts on either side of the dividing line 100, with the only coupling between the two being through the two capacitors 64.

In this embodiment, the resistor 66 is selected of very low value as it receives very little of the power from the oscillator 68. At the oscillator frequency, the series impedance of the series circuit of the coil 60, the capacitor 64 and the resistor 66 are substantially resistive in nature, equal to that of the small value of resistor 66. Almost the entire generator voltage thus appears across the parallel resonant circuit at the oscillator frequency, consisting of the inductor 62 and the capacitor 65, to appear across terminals 72, 74. As will be appreciated, with the capacitive coupling of the capacitors 64, the voltage across the parallel resonant circuit follows from their being a full-wave rectifier formed—consisting of the diode bridge coupled between the terminals 72, 74 and including the components 80, 81, 82, 83. Such four-way rectifier provides a direct current flow through a further diode 84 and a resistor 76 to produce a positive Voltage across capacitor 86. As such, the energy stored in capacitor 86 can be used to power the devices, circuits and signalling apparatus at 88 for a substantial period of time in the event that the power oscillator 68 is turned off. Such diode 84 prevents current from flowing back into the rectifier bridge during such period.

As previously mentioned, conventional circuits and methods may be used to measure the resistance of a strain gauge mounted on the rotating shaft of FIGS. 1 and 2, code the value of the resistance into digital form, and then transmit this information back through the parallel resonance circuit formed by the capacitors 64, the inductor coil 62 and the capacitor 65 to the fixed part of the invention. Such operation, in particular, is accomplished by means of the transistor 101 and the resistor 66.

More specifically, the digitally coded signal is transmitted back to the stationary portion of the apparatus by turning the transistor 101 ON and OFF in accordance with the input signal. Thus when transistor 101 is OFF (or nonconductive), the circuit functions as described above, wherein a current flows through the resistor 66. When transistor 101 is turned ON (i.e. conducting), on the other hand, terminals 102 and 103 essentially go to ground. Such action will be appreciated to short-circuit the parallel tuned resonant circuit so established, to result in a significant change of current through the resistor 66, in producing an output signal at the terminal 110.

Alternatively stated, the sequence of events during operation will be seen as follows: the power oscillator 68 operates and a DC voltage is developed across the capacitor 86 to operate the devices, circuits and signalling apparatus on the rotating shaft 10. Such circuits measure the resistance of the included strain gauge, code its value into digital form, and turn transistor 101 ON and OFF in accordance with the digital information. In the ON or conducting condition, transistor 101 short-circuits the parallel tuned resonant circuit to cause an increase in the current flow through the resistor 66. When the transistor 101 is turned OFF, the current through resistor 66 returns to its previous value, with the voltage developed across it reproducing the digitally generated signal substantially exactly, on the stationary side of the apparatus, to the left of the dividing line 100 in FIG. 3. Mechanical and electrical functions are thus able to be performed on the rotating part of the apparatus, with information obtained on the rotating member being transmitted back to the stationary section, without there being any need for having a source of power on the rotating portion. As will further be understood by those skilled in the art, with the transistor 101 conductive, little or no power is transferred from the stationary portion of the apparatus to the rotating portion. During such period, the energy stored in capacitor 86 supplies the power required to operate the devices, circuitry and signalling apparatus 88. Thus, no interruption in the operation of the circuitry there included results on the rotating section of the construction. Therefore, power is transmitted from the stationary side to the rotating side, measurements are made on the rotating side for the results to be coded and transmitted back to the stationary side. No power supply is required to operate the devices, circuits and signalling apparatus in unit 88, and no mechanical connection exists between the two sides, all of which are able to be operated without any source of power on the rotating shaft, and without there then being any need to change or replace batteries after periods of extended use.

Figure 4A:
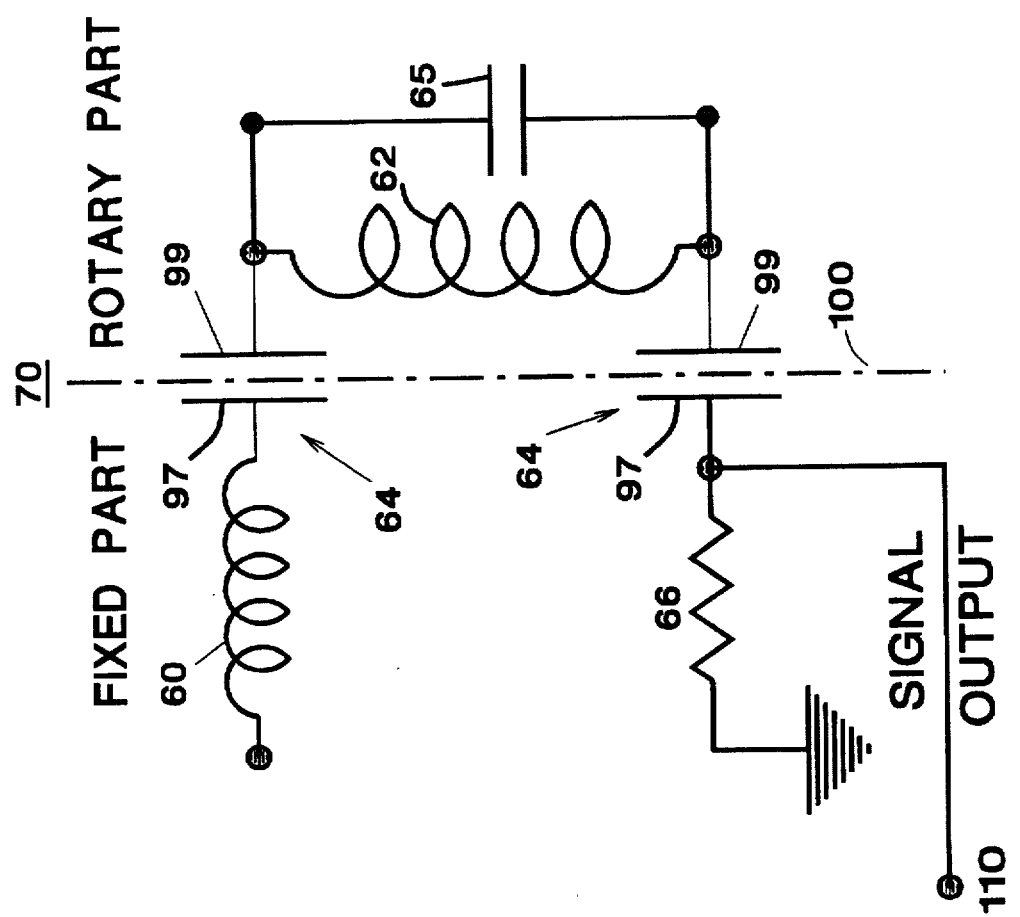
FIGS. 4a and 4b illustrate one manner of forming the capacitor coupling circuit of the invention.
Figure 4B:
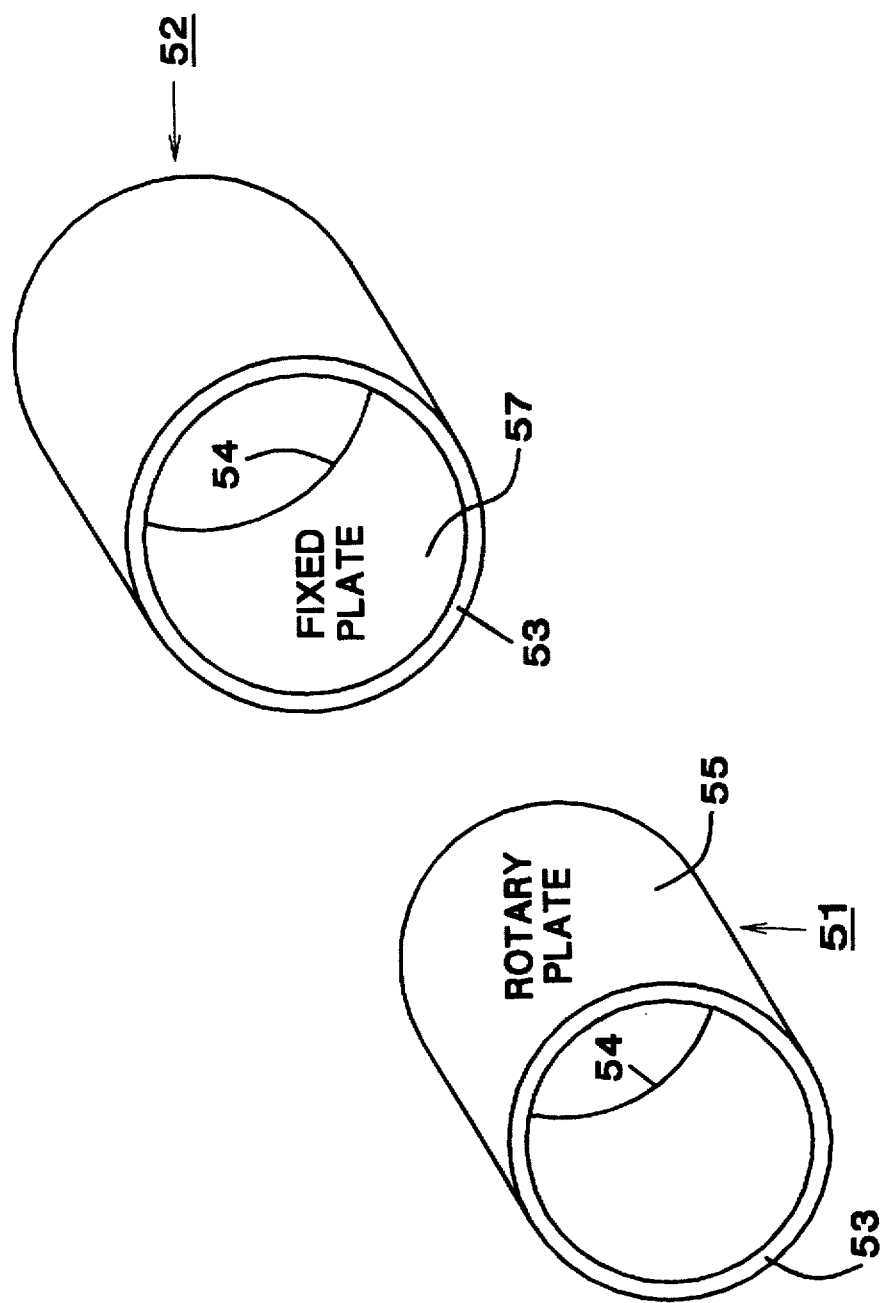

FIG. 4a shows the complete coupling circuit 70 along with the coupling capacitors used for tuning the coils 60 and 62 to resonance. With capacitor coupling of the invention, power and signal are effectively transmitted to and from the rotating and fixed members through the two capacitors 64, one plate of each of which is on the rotating member while the other plate of each is understood as being on the fixed member—and with the coupling being effected through a mutual electrical field between the rotating and fixed plates of each capacitor 64. FIG. 4b illustrates an example of these capacitors 64, with the plate on the fixed member being shown as 97 in FIG. 4a and with the plate on the rotating member being shown as 99.

Thus, referring to FIG. 4b, the capacitors are shown as comprising a first cylinder 51 to fit within a second cylinder 52 in a manner to make their front 53 and rear 54 circular edges coplanar, and with their axes of rotation coaxial. In particular, the cylinder 51 is composed of an insulating material having a metallized layer 55 on its outside, and when fastened (as by gluing) on the shaft comprises the rotating plate 99 of the capacitor 64. In similar manner, the cylinder 52 consists of an insulating material with its own metallized layer 57, this time on the inside of the cylinder. In use, the cylinder 52 is fixed and stationary, and does not rotate as does the cylinder 51 when secured to slide within the cylinder 52, with the metallized outer layer of the cylinder 51 then comprising the plate 99 of the capacitor 64 and the inside metallized layer of the cylinder 52 then comprising the plate 97 of the capacitor 64. As will be appreciated, with the distance between the metallized outer layer 55 of the rotating cylinder 51 and the inside metallized layer 57 of the stationary cylinder 52 being the difference between their outer radius and inner radius respectively, the capacitance exhibited by the capacitors so formed is directly related to the area of the plates and the dielectric constant, and inversely proportional to the distance between the plates. The space between the plates can, in this arrangement, be filled with a solid insulating material which may be configured as a plastic bearing.

While applicant does not wish to be limited to any particular set of component values, a preferred embodiment of the invention is one where cylinders substantially 1 inch in diameter and 1 inch width were employed with a distance between them of 0.01 inches, to yield a capacitance of 17.6 picofarads when employing air as the dielectric. Using two such cylinder arrangements as the capacitors 64 in the circuit of FIG. 3, the desired power and signal transmission requirements to and from the rotating member to the fixed member was attained using the following additional component values:

| Power required for rotary apparatus | 10 milliwatts |
| --- | --- |
| Frequency | 10 MHz |
| Inductive Coil 60 | 29 microhenries |
| Inductive Coil 62 | 13 microhenries |
| Capacitor 65 | 20 picofarads |
| Capacitor 86 | 10 microfarads |
| Resistor 76 | 1,000 ohms |
| Resistor 66 | 10 ohms |

With such an embodiment, with capacitors 64 being formed to exhibit a capacitance of 17.6 picofarads, and with the other component values set forth, approximately 10 volts is generated across capacitor 86 for its operation.

FIG. 5 shows another manner of practicing the invention, without having to mount the capacitor plates on a fixed part of the vehicle. In particular, the two outer plates 20 of FIG. 1 is here bridged with a thin cylinder, to connect them together mechanically, as shown by the reference numeral 111. The only needed connection to the fixed part of the vehicle, in such instance, could be by way of a coaxial cable 113—of the order of one-tenth of an inch in diameter— which allows the whole structure to float on the shaft 10 which, over time, would evidence a degree of vertical movement otherwise making a solid mechanical connection to the chassis somewhat difficult. In the configuration of FIG. 5, the outer plates are prevented from rotating by the tension of the cable 113 which couples into the passenger compartment of the vehicle. In such configuration, the rotary circuitry then resides inside the hollow shaft 10, while the stationary circuitry is included within the passenger compartment.

While there has been described what is considered to be a preferred embodiment of the present invention, it will be readily appreciated by those skilled in the art that modifications can be made without departing from the scope of the teachings herein in employing capacitor coupling in the transmitting of power and signal back and forth between the rotating and fixed members on the apparatus. For at least such reason, therefore, resort should be had to the claims appended hereto for a true understanding of the scope of the invention which in a particular application allows for the measurement and display of horsepower of a motor vehicle without the need for employing batteries on the rotating shaft.

I claim:

1. A combination comprising:
   utilization apparatus;
   first means for transmitting electrical power from a first location towards a second location;

second means, at said second location, responsive to electrical power received from said first means, for operating said utilization apparatus;

third means coupled to said utilization apparatus for generating a signal indicative of performance thereat, and for transmitting said signal to said first means via said second means;

with said first means being stationary in operation, and with said second means being mechanically rotational in operation;

with said second means being devoid of any source of operating power thereon; and with there being an absence of mechanical interconnection between said first means and said second means; and wherein said first means includes a fixed electrical coil and one plate of a pair of capacitors having two plates each, and wherein said second means includes a rotating electrical coil and a second plate of said pair of capacitors.

2. The combination of claim 1 wherein said second means includes an electrical coil and said second plate of said pair of capacitors on a rotating mechanical shaft.

3. The combination of claim 2 wherein said first means also includes an electrical power oscillator of given frequency, and wherein said fixed electrical coil and said pair of capacitors are tuned to resonate at the frequency of said oscillator.

4. The combination of claim 3 wherein said second means also includes a third capacitor coupled with said rotating electrical coil and tuned to resonate at said frequency of said oscillator.

5. The combination of claim 3 wherein said fixed electrical coil and said pair of capacitors are tuned in series resonance with said power oscillator.

6. The combination of claim 5 wherein said rotating electrical coil and said third capacitor are tuned in parallel resonance with said power oscillator.

7. The combination of claim 4 wherein each of said pair of capacitors comprise a first cylinder within a second cylinder, with coplanar front and rear circular edges, and with coaxial axes of rotation.

8. The combination of claim 7 wherein said first cylinder includes an insulating material having a metallized outer surface, and comprises said second plate of said pair of capacitors.

9. The combination of claim 8 wherein said second cylinder includes an insulating material having a metallized inner surface, and comprises said one plate of said pair of capacitors.

10. The combination of claim 3 wherein there is also included a strain gauge mounted on said rotating mechanical shaft, and wherein said third means generates a signal indicative of the resistance of said strain gauge at any given instant of time.

11. The combination of claim 10 wherein said third means generates a digital signal indicative of said resistance of said strain gauge.

12. The combination of claim 11 wherein said utilization apparatus includes the wheels of an automotive vehicle.

* * * * *